July 12, 1966 D. L. KILBOURN 3,261,015
MINI-BALL RADAR TARGET SYSTEM
Filed Feb. 26, 1964

Dorwin L. Kilbourn,
INVENTOR.

BY Harry M. Saragovitz
Edward J. Kelly
Herbert Berl
Harold W. Hilton 3,261,015
MINI-BALL RADAR TARGET SYSTEM
Dorwin L. Kilbourn, Huntsville, Ala., assignor to the United States of America as represented by the Secretary of the Army
Filed Feb. 26, 1964, Ser. No. 347,630
5 Claims. (Cl. 343—17.7)

The invention described herein may be manufactured and used by or for the Government for governmental purposes without the payment of any royalty thereon.

This invention pertains to a radar target test system and more particularly to apparatus and method for field testing radar systems.

In the testing and evaluation of radar systems, methods or techniques are required which can give a measure of the efficiency and capabilities of the radar system to detect the location and velocity of targets. Any method or technique for such tests and evaluations is only as good as its ability to be controlled. For example, if the characteristics of a radar receiver are being studied, then the qualities of the signal entering the receiver should be well known. If the receiver signal comes directly from a transmitter these signals can be readily compared by standard laboratory techniques, and the behaviorship of the receiver can then be determined.

However, in the field operation of a radar system, the received signal does not come directly from the transmitter, but it is received indirectly by "reflection" from a target. In such a case the reflected signal must either be a true image of the transmitted signal, or the "reflection" properties of the target must be known. Except for targets of extremely simple geometry, the prediction of "reflection" properties are usually very complex. Thus, if proper correlation between characteristics of transmitted and received signals are to be expected, then targets of simple geometry are essential in evaluation of radar transmitters and/or receiver systems.

Heretofore, radar targets generally have been large, bulky systems of complex design which could be only sparsely launched and then only at great cost. Their intricate geometry present radar signatures that are so irregular that the wave forms are hardly distinguishable from system noise waveform. These waveform complexities present undesirable features in the evaluation of noise and sensitivity problems of radar transmitter and receiver systems.

The radar signatures of such targets are made even more complex as the target changes its position with respect to the incident transmitted radar beam. These changes may come about if the target angle of attack changes or if the target rolls, pitches or yaws.

The above mentioned problems are overcome by the "mini-ball" radar target system of the present invention. In this system a target missile which possesses spherical symmetry is used. Reflected or scattered energy profiles are much easier to determine than for any other geometry of missile. Roll, yaw and pitch problems are eliminated. Simplicity of shape and wide choices of materials permit ready launching from simple ballistic launchers. An extensive range of velocity profiles and trajectories are available with simple adjustments of the launching mechanism. Targets can be readily changed in size and composition to make them compatible with the radar system under test and the type of evaluation to be made. Reflected signatures are simple and regular in waveform and can be easily distinguished even at low signal to noise ratios. Scaling of target systems can be accomplished to permit the use of "mini-ball" radar targets on short ranges with small inexpensive spheres which can be launched repeatedly at a cost which is completely negligible as compared to other types of target systems.

An object of this invention, therefore, is to provide apparatus for field testing radar systems.

A further object of the present invention is to provide a method and apparatus for obtaining a positive check on guided missile radar systems in a field test that would produce results similar to the tactical situation, yet permit step by step control of variables.

Other objects and advantages of the present invention will be more readily apparent from the following detailed description taken in conjunction with the accompanying drawings in which.

Figure 1:
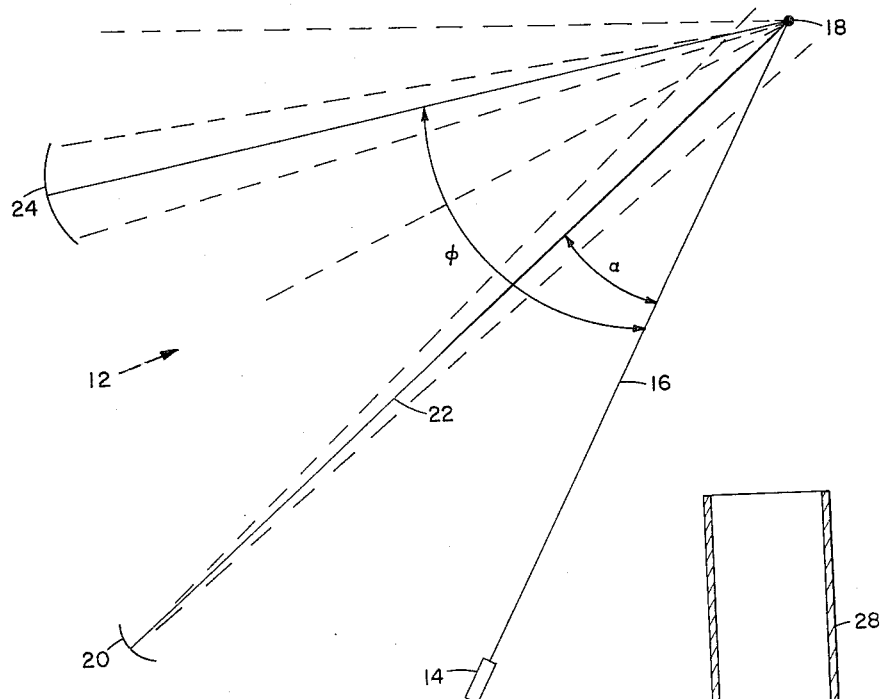
FIGURE 1 is a diagrammatic view illustrating the arrangement of the radar target test system of the present invention.

As shown in FIGURE 1 the test system 12 includes a launcher 14 which may, if desired, be a gas gun. The launcher is disposed to propel the missile in a predetermined trajectory 16 into impact with a target 18. A transmitter 20 is disposed for transmisison of electromagnetic energy in a pattern determined by the radar system. The spherical mini-ball is launched in the trajectory 16 and a radar beam of electromagnetic energy 22 is transmitted by transmitter 20 in a mode determined by design of the transmitter system. The beam may be transmitted either in a fixed direction and the trajectory of the mini-ball pre-set so that the mini-ball will pass into the transmitted beam, or the beam may be swept through space so as to search for, locate and follow the mini-ball missile in its flight.

Energy from the transmitter impinging upon the mini-ball missile is reflected, diffused or scattered by the mini-ball in a pattern which is predictable from knowledge of the transmitted frequency and beam shape, size and material of the mini-ball and the range of the missile.

A receiver 24 intercepts a portion of the energy scattered by the mini-ball. The received energy is then processed and analyzed in accordance with the tests being made.

As shown in FIGURE 1, the launcher, transmitter, and receiver are located at stations disposed in triangular relation. The line 14–18 defines the trajectory 16; 20–18 defines the instantaneous line of sight of transmitter to target mini-ball missile; 24–18 illustrates the instantaneous line of sight of lauch trajectory to transmitter line of sight; $\alpha$ is the angular displacement of launch trajectory to transmitter line of sight; and $\Phi$ is the angular displacement of launch trajectory to receiver line of sight.

In order to be useful, a target must reflect either a true sample of the reflected signal, or the reflection characteristics must be predictable. Except for targets of extremely simple geometry, the prediction of reflection properties is usually very difficult. This is especially true where the target's aspect to the signal beam may be changing continuously. If good correlation is exposed between characteristics of transmitted and received signals, targets of simple geometries are essential.

The size of the target is also very important in test procedures. The magnitude of the reflected signal intercepted by the receiving antenna must be within dynamic range of the receiver. If the signal is too big, saturation will occur. If the signal is too small, it could be lost in the noise level of the receiver. The strength of the received signal depends on the reflection properties of the target and the range of the target. It is possible for a small target at very close range to saturate a receiver, whereas a large target at a much greater distance might not. The radar cross-section of a target is a relationship which correlates received signal power, transmitted signal power, and the target's range, geometry and substance.

In the development of guided missile radar systems, velocity-of-target measurement capabilities are usually a part of the systems' design. These capabilities must be determined or verified by using the system to measure the velocity of a target which is traveling with a known velocity. Hence, the velocity of a target must be known at each instant during the test period, or the velocity profile must be predictable previous to the test period.

From the foregoing discussion, it is concluded that a target should have at least three fundamental properties to serve as a tool for testing developmental guided missile radar systems. These are:

(1) A shape from which its reflection properties can be predicted.

(2) A size which will produce a predictable radar cross-section that will be compatible with the receiver and range of operation.

(3) A velocity profile that is either known or predictable.

The first of these three properties is obtainable when a spherical object is used. This geometry eliminates any change in signal characteristics because of change in aspect of the target relative to the signal beam. It also gives one of the simpler reflection patterns because the incidental signal is scattered or defracted in a regular and predictable pattern which depends on the incident wavelengths, the target's material substance, and the regularity of its curved surface. Complex interference patterns due to irregular surface shapes are eliminated. The dispersion pattern for spherical bodies may be easily calculated from Maxwell's electromagnetic equations.

Figure 3:
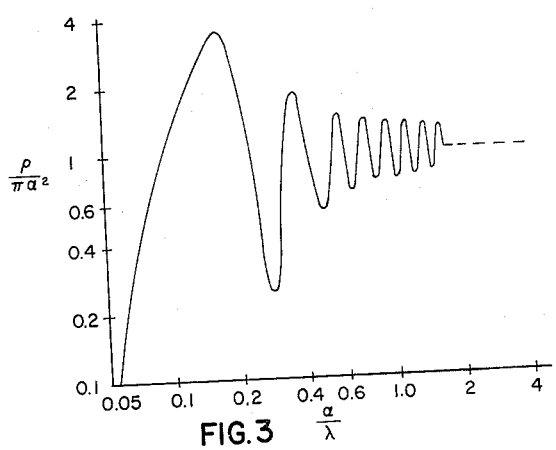
FIGURE 3 is a graph illustrating back scattering from a metallic sphere.

The property of the target's cross section can be optimized by examining the solutions to Maxwell's equations for radiation scattered by an object, and by a knowledge of the receiver's dynamic range (including antenna characteristics). A target's radar cross section is defined as $$\rho = 2\pi \frac{S_R^2}{E_0}$$

where $\rho$ is the radar cross section, $E_0$ is the amplitude of the incident plane wave, and $S_R$ is the ratio of the scattered wave amplitude to the distance from target to receiver. A solution to Maxwell's equations for scattering from a sphere will give a result as shown in FIGURE 3, where $\rho/\pi\alpha^2$ is plotted as a function of $\alpha/\lambda$, where $\alpha$ is the radius of the sphere, and $\lambda$ is the incident wavelength. It can be seen that with targets whose radii are approximately the same as the wavelength of the radiation used, there are definite maxima and minima values of the cross section due to resonance effects.

A spherical conductor, for example, having a 0.388-inch diameter gives a radar cross section of $-36.5$ db/m.$_2$ at 9.80 kmc.

The property of velocity profile may be predicted by using a properly designed self-propelled target such as an airplane or a long-burning rocket. It may also be predicted by using a ballastic missile whose trajectory can be determined either theoretically or empirically. Theoretical trajectory prediction normally is difficult except for bodies in free space or massive bodies which move rather slowly over short ranges. If small targets of high velocities are used, the equations of motion become rather complex because of the inherent types of drag forces and wind loadings. Empirical trajectory predictions are usually easier to make. However, if bodies of known shape are used, and if these bodies are of rather simple geometry, much information is readily available which can give a velocity profile from a fluid-dynamic theory approach. Even in this case, the answers depend upon certain empirical relationships which at best can only give an approximation. Any theoretical approach must ultimately fit the experimental results, and experimental data are necessary to obtain such correlation.

Figure 2:
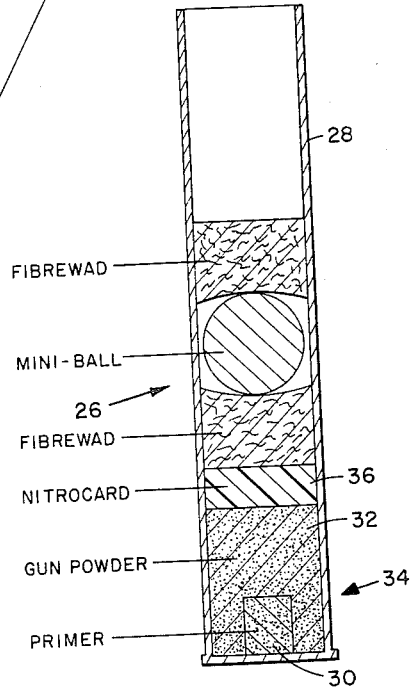
FIGURE 2 illustrates the cross-section of a mini-ball shell.

In free flight of the spherical mini-ball no pitch or yaw stability problems are present. FIGURE 2 illustrates the manner in which the mini-ball 26 is loaded for firing. A shell 28 is provided at the bottom thereof with a primer 30. Gun powder 32 is carried in the bottom 34 of shell 28. A nitrocard member 36 carried on the gun powder and fibrewad is disposed atop the nitrocard. Additional fibrewad is loaded in the shell between the upper portion 38 thereof and mini-ball 26. The shell is loaded with loading pressures between 50 and 60 p.s.i.

It is to be understood that the size of the mini-balls depends upon the frequency of the radar to be tested.

It should be readily apparent that the present invention provides an economical radar target test system which includes a target of large radar cross-section while being small in physical dimensions, is provided with a shape which eliminates target aspect problems and a velocity profile which is reproducible.

It is to be understood that while a specific embodiment and certain methods of operation of the invention are disclosed herein that many modifications may be resorted to without departing from the spirit and scope of the appended claims.

I claim:

1. A radar test system for field testing a radar system including a radar transmitter and radar receiver, said test system comprising:
    (a) a spherical missile provided with a predetermined radar cross-section;
    (b) a launcher disposed for launching said missile in a predetermined trajectory in free space at selected velocity; and
    (c) stations disposed in predetermined angular relationship for respective support of said launcher, said transmitter and said receiver;
    (d) said transmitter disposed for transmisison of a signal for impingement thereof on said missile and reflection therefrom;
    (e) said receiver disposed to receive said signal from said missile for analysis thereof to determine the characteristics of said transmitted and received signals for comparison thereof with a reference signal.

2. Apparatus as in claim 1 wherein said missile is provided with predetermined reflection properties and a configuration having a predetermined velocity profile.

3. Apparatus as in claim 2 wherein said spherical missile is metallic to prevent distortion thereof during launching.

4. A radar target test system having three stations disposed in triangular relationship comprising:
    (a) a launcher positioned at a first station; and
    (b) a spherical missile provided with a predetermined radar cross-section and disposed for launching from said launcher in a predetermined trajectory at selected velocity;
    (c) a second station having means for transmitting a beam of electromagnetic energy for impingement thereof on said missile in the trajectory;
    (d) a third station having means for receiving said beam on reflection from said missile and providing an output signal representative of the characteristics of said beam for comparison of indications thereof with indications of a reference signal to determine the accuracy of the radar system.

5. Apparatus as in claim 4 wherein said stations are disposed so that the angle of the reflected beam with the plane of the trajectory is greater than the angle of the transmitted beam with the trajectory plane.

References Cited by the Examiner

UNITED STATES PATENTS 2,817,081  12/1957  Van Roberts ---------- 343—9
3,136,992  6/1964   French -------------- 343—7

OTHER REFERENCES

Rhodes, D. R.: Radar Echo Measurements Using Models. In Radio-Electronic Engineering, pp. 19–21, April 1954.

CHESTER L. JUSTUS, *Primary Examiner.*

R. E. KLEIN, R. D. BENNETT, *Assistant Examiners.*